United States Patent
Muthyala et al.

(10) Patent No.: US 9,821,242 B2
(45) Date of Patent: Nov. 21, 2017

(54) GENERATION OF BUILDING INSTRUCTIONS FOR CONSTRUCTION ELEMENT MODELS

(75) Inventors: Siddharth Muthyala, Billund (DK); Harm Jan Van Beek, Rotterdam (NL); Nicolas David Alain Guyon, St. Barthelemy d'Anjou (FR); Frantz Lasorne, Nantes (FR); Mikkel Holm Jensen, Aarhus (DK)

(73) Assignee: LEGO A/S, Billund (DK)

( * ) Notice: Subject to any disclaimer, the term of this patent is extended or adjusted under 35 U.S.C. 154(b) by 51 days.

(21) Appl. No.: 14/119,534

(22) PCT Filed: May 22, 2012

(86) PCT No.: PCT/EP2012/059471
§ 371 (c)(1),
(2), (4) Date: Jun. 12, 2014

(87) PCT Pub. No.: WO2012/160057
PCT Pub. Date: Nov. 29, 2012

(65) Prior Publication Data
US 2014/0378022 A1 Dec. 25, 2014

(30) Foreign Application Priority Data

May 23, 2011 (DK) .................................. 2011 70255

(51) Int. Cl.
*A63H 33/04* (2006.01)
*G06T 19/20* (2011.01)
(Continued)

(52) U.S. Cl.
CPC ........... *A63H 33/042* (2013.01); *A63H 33/06* (2013.01); *G06T 19/20* (2013.01);
(Continued)

(58) Field of Classification Search
CPC ...................................................... A63H 33/04
(Continued)

(56) References Cited

U.S. PATENT DOCUMENTS 3,005,282 A   10/1961   Christiansen
3,670,941 A    6/1972   Grinnell et al.
(Continued)

FOREIGN PATENT DOCUMENTS

DE   100 06 834 A1    8/2001
EP   1 047 021 A2    10/2000
(Continued)

OTHER PUBLICATIONS

International Search Report for corresponding international application No. PCT/EP2012/059471, dated Jun. 29, 2012.
(Continued)

*Primary Examiner* — Aarti B Berdichevsky
*Assistant Examiner* — Dolores Collins
(74) *Attorney, Agent, or Firm* — Day Pitney LLP

(57) ABSTRACT

A toy construction system comprising a set of toy construction elements with coupling means for releasably interconnecting the toy construction elements; and a data processing system comprising image capturing means, processing means, and display means, wherein the data processing system is adapted to capture an image of a partial toy construction model constructed from a subset of the toy construction elements; process the captured image to detect at least a position and an orientation of the partial toy construction model; identify a user selection indicative of a user selection of at least one of a set of subsequent construction elements, each subsequent construction element being connectable to the partial toy construction model; responsive to the detected position and orientation of the partial toy construction model, display on said display
(Continued)

means a composite image comprising the captured image having superimposed an image of at least the selected subsequent construction element.

25 Claims, 5 Drawing Sheets

(51) Int. Cl.
  *A63H 33/06* (2006.01)
  *A63F 9/24* (2006.01)

(52) U.S. Cl.
  CPC ... *A63F 2009/246* (2013.01); *A63F 2250/287* (2013.01); *G06T 2219/2008* (2013.01)

(58) Field of Classification Search
  USPC .......................................................... 446/91
  See application file for complete search history.

(56) References Cited

U.S. PATENT DOCUMENTS

| | | | |
|---|---|---|---|
| 3,670,942 A | 6/1972 | Pomeroy | |
| 5,042,972 A * | 8/1991 | Bach ..................... | A63H 33/042 446/175 |
| 5,697,829 A | 12/1997 | Chainani et al. | |
| 5,724,074 A | 3/1998 | Chainani et al. | |
| 5,867,166 A * | 2/1999 | Myhrvold ............. | G06T 11/001 345/419 |
| 6,389,375 B1 * | 5/2002 | Thomsen ................ | G06T 17/10 345/420 |
| 7,596,473 B2 * | 9/2009 | Hansen ................... | G06F 17/50 345/420 |
| 7,979,251 B2 * | 7/2011 | Jakobsen ................ | G06T 17/10 700/95 |
| 8,374,829 B2 * | 2/2013 | Jakobsen ................ | G06T 17/10 345/8 |
| 8,615,471 B2 | 12/2013 | Hannigan et al. | |
| 2002/0127944 A1 | 9/2002 | Spector | |
| 2005/0024360 A1 | 2/2005 | Abe et al. | |
| 2006/0221081 A1 * | 10/2006 | Cohen ..................... | G06T 13/00 345/473 |
| 2007/0262984 A1 * | 11/2007 | Pruss ...................... | G06T 19/20 345/420 |
| 2009/0029771 A1 | 1/2009 | Donahue | |
| 2009/0197678 A1 | 8/2009 | Huang | |
| 2010/0033404 A1 | 2/2010 | Hamadou et al. | |
| 2010/0099493 A1 | 4/2010 | Horovitz | |
| 2010/0164953 A1 | 7/2010 | Wouhaybi et al. | |
| 2010/0241403 A1 | 9/2010 | Jakobsen et al. | |
| 2010/0306712 A1 * | 12/2010 | Snook ..................... | G06F 3/017 715/863 |
| 2011/0065496 A1 | 3/2011 | Gagner et al. | |

FOREIGN PATENT DOCUMENTS

| | | |
|---|---|---|
| EP | 1047021 A2 | 10/2000 |
| EP | 1271415 A1 | 1/2003 |
| EP | 2 202 608 A1 | 6/2010 |
| GB | 2 470 072 A | 11/2010 |
| GB | 2 470 073 A | 11/2010 |
| GB | 2470072 A | 11/2010 |
| JP | 2002-159019 A | 5/2002 |
| JP | 2006-040045 A | 2/2006 |
| JP | 2007-034981 A | 2/2007 |
| JP | 2010-049690 A | 3/2010 |
| WO | 2004/104811 A2 | 12/2004 |
| WO | 2004/104811 A3 | 12/2004 |
| WO | 2009047225 A1 | 4/2009 |
| WO | 2010/029553 A1 | 3/2010 |
| WO | 2010/128321 A2 | 11/2010 |
| WO | 2010128321 A2 | 11/2010 |
| WO | 2010/150232 A1 | 12/2010 |
| WO | 2011/017393 A1 | 2/2011 |

OTHER PUBLICATIONS

International Search Report for related international application No. PCT/EP2012/059469, dated Jun. 20, 2012.
Extended European Search Report in related European application No. EP 16152094.5, dated Jun. 16, 2014.
USPTO Non-Final Office Action in related U.S. Appl. No. 14/119,556, dated Apr. 15, 2016.
Communication of a Notice of Opposition together with Facts and Evidence presented in support of the Opposition, issued in related European Patent Application No. 12721868.3, now European Patent No. 2714222 B1, Jan. 18, 2017.
Die made from LEGO, and CLUB. Web Archive as of LEGO, Dec. 26, 2008, and 26 on [online], [Nov. 24, 2016 search], and Dec. 26, 2008. URL: <https://web.archive.org/web/20081226153143/>.
REGO Creator Own house 5891. The REGO diary, Jan. 31, 2011[online], [Nov. 24, 2016 search]. <URL: <http://ukikusa3.blog35.fc2.com/blog-entry-490.html>.
Goto AR supporting system by teacher video superposition display to working clearance besides Michihiko, Journal of the Institute of Image Electronics Engineers of Japan, general incorporated foundation Institute of Image Electronics Engineers of Japan, vol. 39, 631:643, Sep. 25, 2010.
LEGO, AR catalog, [online] uploaded on Oct. 1, 2010, [May 27, 2016 search]. URL: <http://www.rockets.co.jp/blog/?p=1062>.
SkawaLtd, LEGO Platformer game—Mobile Augmented Reality (AR), Youtube, uploaded on Jan. 14, 2011, [online], [Nov. 24, 2016 search]. URL: <https://www.youtube.com/watch?v=1-7HnOmPYjI>.
LEGO. SIGNS, [online], released Apr. 2010, [May 27, 2016 search]. URL: <http://www.advertolog.com/lego/directmarketing/lego-signs-15413855/ >.
USPTO Final Office Action in related U.S. Appl. No. 14/119,556, dated Dec. 7, 2016.
JPO's Notification of Reasons for Refusal for related Japanese application No. 2014-511846, dated Jun. 1, 2016. (with English translation).
JPO's Notification of Reasons for Refusal for related Japanese application No. 2014-511845, dated Nov. 24, 2016. (with English translation).
International Search Report for corresponding international application No. PCT/EP2012/059469, dated Jun. 20, 2012.
Wagner et al., "ARToolKitPlus for Pose Tracking on Mobile Devices", Computer Vision Winter Workshop 2007, St. Lambrecht, Austria, Institute for Computer Graphics and Vision, Graz University of Technology, Feb. 6-8, 2007.

* cited by examiner

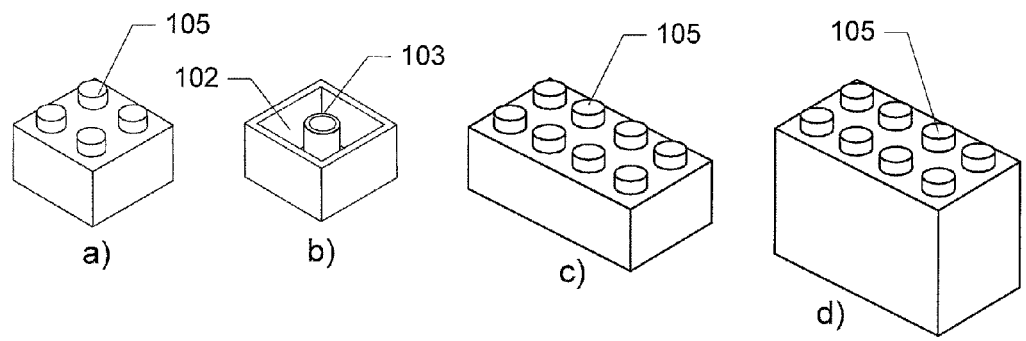
Fig. 1 - PRIOR ART
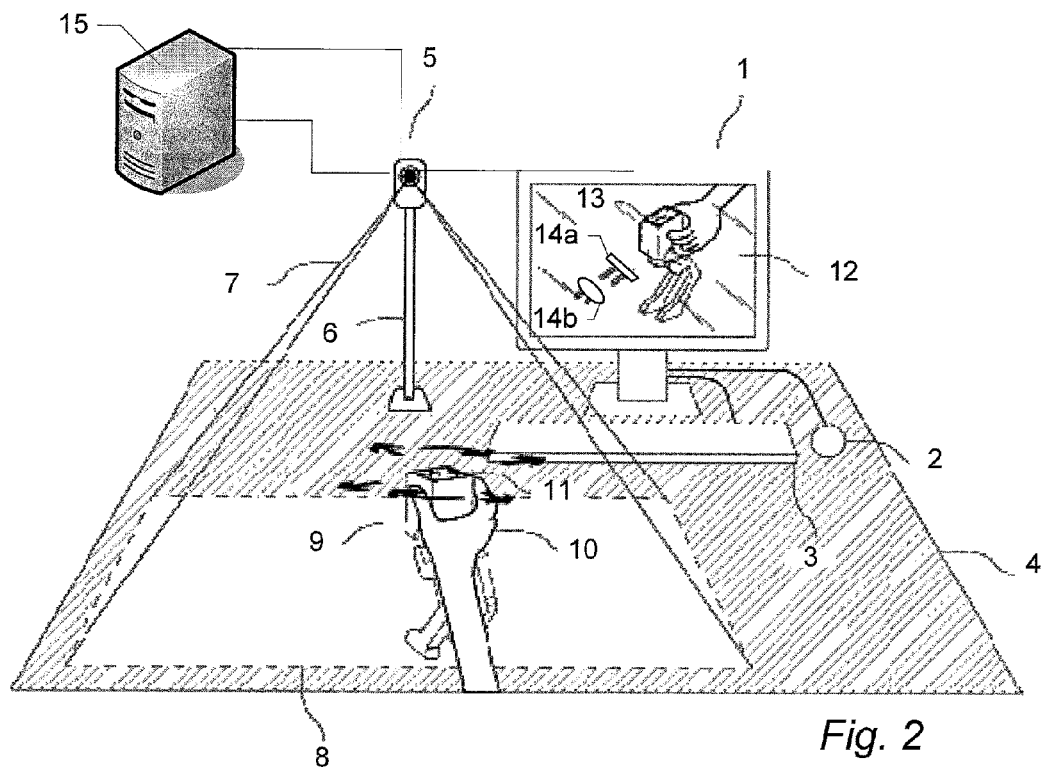
Fig. 2

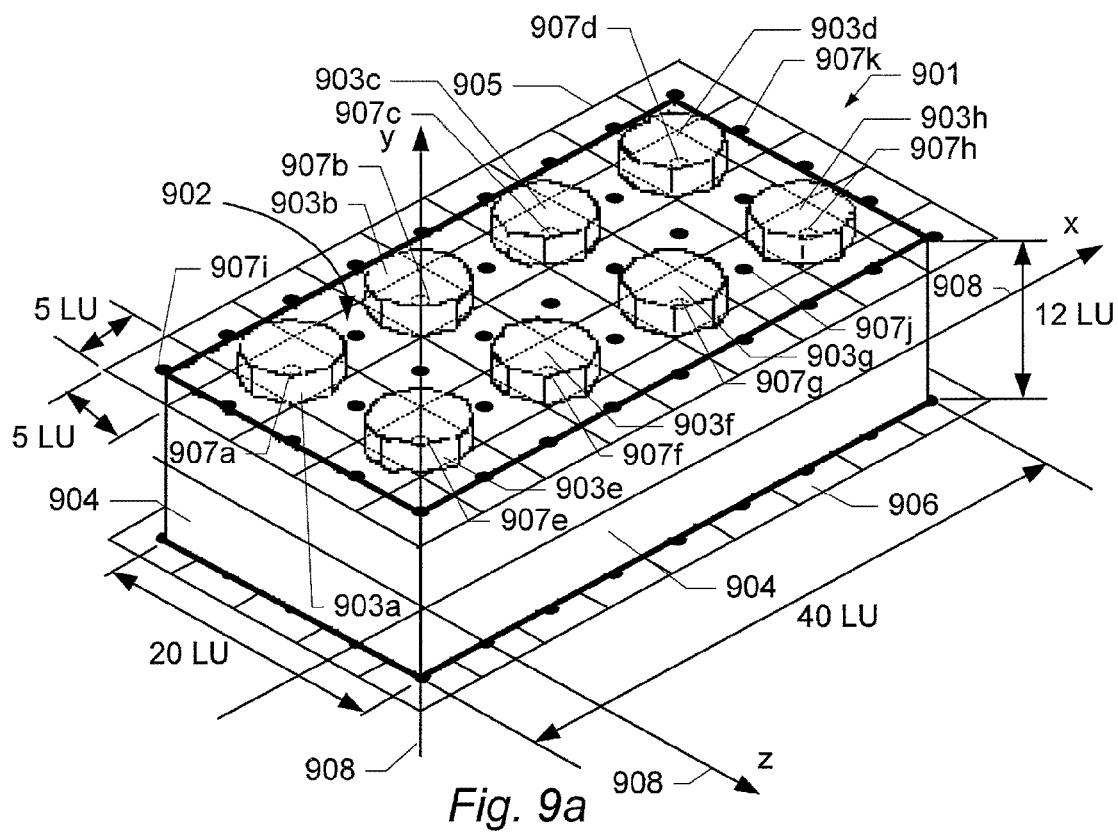
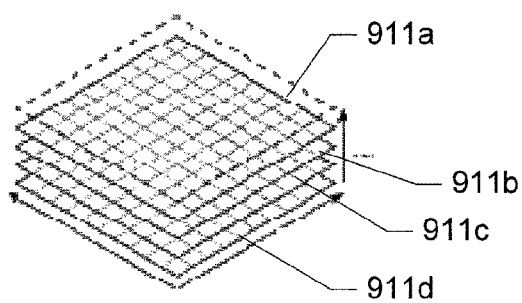
Fig. 9a
Fig. 9b

GENERATION OF BUILDING INSTRUCTIONS FOR CONSTRUCTION ELEMENT MODELS

CROSS-REFERENCE TO RELATED APPLICATIONS

This application is a U.S. National Stage of International Application No. PCT/EP2012/059471, filed on May 22, 2012 and published on Nov. 29, 2012, as WO 2012/160057 A1, which claims the benefit of priority to Danish Patent Application No. PA 2011 70255, filed on May 23, 2011.

TECHNICAL FIELD

The present invention relates to the generation of building instructions for toy construction models.

BACKGROUND

There are various known types of modelling concepts of physical construction toy sets. Especially, concepts using modular or semi-modular concepts are very popular as they provide an interesting and challenging play experience. Typically, these concepts provide a set of pre-manufactured construction elements that can be interconnectable with each other in some predetermined way according to modules of the pre-manufactured elements. The pre-manufactured elements may resemble well-known objects adapted to a specific modelling task. Thus in e.g. building a model of a house the elements may resemble wall bricks, roof tiles, doors, and windows. The object of selecting the elements in this way is that the work involved with the building of a model of a house is reduced significantly compared to a situation where all details of the house are to be defined each time a new model should be made. However, the complete freedom in building a house or another object is traded off for the simplicity of building the model.

For example, the toy construction sets available under the name LEGO comprise a plurality of different types of interconnectable construction elements having coupling means in the form of protrusions and corresponding cavities. The coupling means are arranged according to regular grid patterns, thereby allowing a wide variety of interconnections between construction elements.

Typically, such toy construction sets comprise a set of construction elements suitable for creating one or more construction element models, e.g. an animal, a robot, or another creature, a car, an airplane, a spaceship, a building, or the like. Typically, a construction set further includes printed building instructions or assembly instructions that illustrate how to construct a certain model from the construction elements of the set.

Typically, the building instructions enclosed in a toy construction set comprise a sequence of pictures illustrating step by step how and in which order to add the construction elements to the model. Such building instructions have the advantage that they are easy to follow, even for children without great experience in toy construction sets and/or without reading skills.

However, such building instructions have the disadvantage that they are labour-intensive and expensive to produce. Typically, the model for which building instructions are to be created is broken down into reasonable building steps and each building step is subsequently drawn in a CAD system and finally printed.

More recently, building instructions have been generated in electronic rather than in printed form. In particular, animated building instructions where the more complicated building steps are animated. However, it remains a problem to provide toy construction sets that inspire children to create their own models or to rebuild the model in a different way, thereby increasing the play value of the toy construction set.

SUMMARY

Disclosed herein are embodiments of a toy construction system which comprises a set of toy construction elements with coupling means for releasably interconnecting the toy construction elements. Embodiments of the toy construction system comprise a data processing system comprising image capturing means, processing means, and display means, wherein the data processing system is adapted to
  capture an image of a partial toy construction model constructed from a subset of the toy construction elements;
  process the captured image to detect at least a position and an orientation of the partial toy construction model;
  identify a user selection indicative of a user selection of at least one of a set of subsequent construction elements, each subsequent construction element being connectable to the partial toy construction model;
  responsive to the detected position and orientation of the partial toy construction model, display on said display means a composite image comprising the captured image having superimposed an image of at least the selected subsequent construction element.

Hence, the user is presented with an image of the partial model built so far and with a choice to select one or more subsequent construction elements from a set of possible alternative subsequent construction elements, i.e. from a set of alternative continuations. Hence, the subsequent construction elements may be alternative subsequent construction elements.

Consequently, the number of possible construction paths, and possibly even the number of resulting toy models, available to the user is increased, thereby allowing for a variety of different building experiences.

As the system detects the user selection and displays at least the selected subsequent construction element superimposed to the captured image of the current partial construction model, and responsive to the detected position and orientation of the current partial model, the system may provide clear and easy-to-follow guidance to the user as to where and how the selected subsequent construction element is to be connected.

In some embodiments the data processing system may be operable to display on said display means a composite image comprising the captured image having superimposed an image of at least the selected subsequent construction element in a position and orientation relative to the partial toy construction model corresponding to said subsequent construction element being coupled to the partial toy construction model.

In some embodiments, the data processing system may be operable to obtain a digital representation of the partial construction model; and, responsive to the obtained digital representation, display respective images of the set of subsequent construction elements, e.g. by displaying a composite image of the captured image superimposed with the images of the set of subsequent construction elements.

Examples of digital representations include an identifier or other suitable data structure identifying a partial toy construction model.

The data processing system may be operable to generate a digital representation of an updated partial toy construction model from the digital representation of the partial toy construction model and from the identified user selection. Hence, based on detected user selections of respective subsequent construction elements, the data processing system may determine which construction path the user has followed, thus identifying which subsequent partial toy construction model the user has arrived at when the user couples the selected subsequent construction element to the current partial construction model according to the building instructions displayed by the data processing system. Accordingly, obtaining a digital representation of the partial construction model may comprise determining or generating the digital representation of the partial toy construction model from a digital representation of a previous partial toy construction model and from a previous user selection.

In some embodiments, the data processing system may be adapted to determine the set of subsequent construction elements from said digital representation and from a data structure indicative of a plurality sequences of construction steps, each sequence resulting in one of a set of alternative construction models constructable from the toy construction set. In some embodiments, the digital representation may be comprised in the data structure For example, the data structure may be any suitable tree data structure, e.g. representative of an acyclic directed graph comprising nodes and edges where each node represents a toy construction model, and each edge connecting a first and a second node represents a connection of one or more subsequent construction elements connectable to the partial toy construction model represented by the first node so as to arrive at a (partial) toy construction element represented by the second node.

In some embodiments, processing the captured image to detect at least a position and an orientation of the partial toy construction model comprises detecting at least one augmented reality (AR) marker, and determining the position and orientation of the toy construction model from the detected at least one augmented reality marker.

The data processing system may be operable to identify the user selection in a number of different ways. For example, the user may indicate the user selection by a suitable user input, e.g. by pointing or clicking with a pointing device such as a computer mouse onto the displayed image of a subsequent construction element. Alternatively or additionally, in some embodiments, processing the captured image comprises identifying at least one added construction element; and the data processing system may be adapted to determine the user selection from said identified added construction element. Hence, the user may simply couple the selected physical subsequent construction element to the physical partial construction model. When the data processing system detects which subsequent construction element has been added to the model, the data processing system may determine the selected subsequent construction element to be the detected one. In some embodiments, the data processing system may further detect the position and/or orientation of the added construction element relative to the partial toy construction model.

In some embodiments, identifying the at least one added construction element comprises detecting an augmented reality marker included in the added construction element.

The present invention can be implemented in different ways including the toy construction system described above and in the following, a data processing system, methods, and further product means, each yielding one or more of the benefits and advantages described in connection with the first-mentioned toy construction system, and each having one or more preferred embodiments corresponding to the preferred embodiments described in connection with the first-mentioned toy construction system and/or disclosed in the dependent claims.

In particular, the features of the method described herein may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

Accordingly, the invention further relates to a data processing system adapted to perform the method described above and in the following. The invention further relates to a computer program comprising program code means for performing all the steps of the method described above and in the following when said program is run on a computer. The invention further relates to a computer program product comprising program code means for performing the method described above and in the following when said computer program product is run on a computer. The program code means may be stored on a computer readable medium and/or embodied as a propagated data signal.

BRIEF DESCRIPTION OF THE DRAWINGS

Aspects of the invention will be explained more fully below in connection with a preferred embodiment and with reference to the drawing, in which:

FIGS. 1a-d each show a prior art toy building brick,

FIG. 2 shows an embodiment of a computer system as disclosed herein.

FIGS. 9a-b illustrate an example of a toy construction system defining a regular grid.

DETAILED DESCRIPTION

Figure 3:
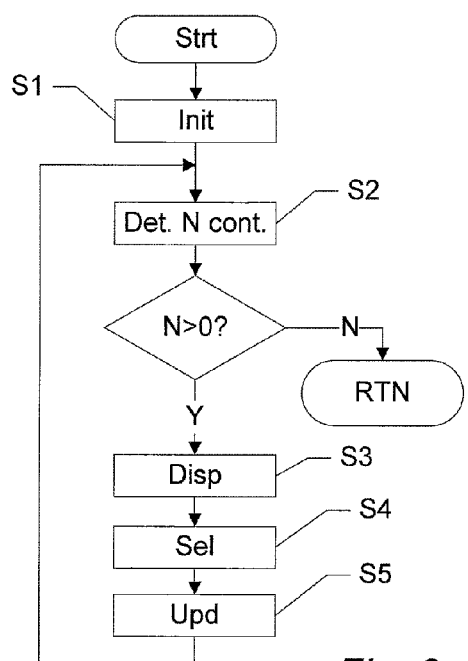
FIG. 3 shows a flow diagram of an embodiment of a process of displaying building instruction steps in for a toy construction model.

Various aspects and embodiments of toy construction systems disclosed herein will now be described with reference to toy construction elements in the form of bricks. However, the invention may be applied to other forms of construction elements used in toy construction sets.

FIGS. 1*a-d* each show a prior art toy building brick with coupling studs 105 on their top surface and a cavity 102 extending into the brick from the bottom. FIGS. 1*a-b* show a top side of a toy building brick, while FIG. 1*b* shows the bottom side of the same toy building brick. FIGS. 1*c-d* show examples of similar toy building bricks of different sizes. The cavity has a central tube 103, and coupling studs of another brick can be received in the cavity in a frictional engagement as disclosed in U.S. Pat. No. 3,005,282. The building bricks shown in the remaining figures may have this known type of coupling means in the form of cooperating studs and cavities. However, other types of coupling means may also be used. The coupling studs are arranged in a square planar grid, i.e. defining orthogonal directions along which sequences of coupling studs are arranged. Generally, such an arrangement of coupling elements allows the toy bricks to be interconnected in a discrete number of orientations relative two each other, in particular at right angles with respect to each other. It will be appreciated that other geometric arrangements of coupling elements may result in different orientational constraints. For example, the coupling elements may be arranged in a triangular, regular grid allowing a building element to be placed on another building element in three different orientations.

Generally, the coupling means may include coupling elements that may be grouped into different classes of coupling elements, e.g. connectors, receptors, and mixed elements. Connectors are coupling elements which may be received by a receptor of another construction element, thereby providing a connection between the construction elements. For example, a connector may fit between parts of another element, into a hole, or the like. Receptors are coupling elements which can receive a connector of another construction element. Mixed elements are parts that can function both as a receptor and a connector, typically depending on the type of the cooperating connection element of the other construction element.

Construction elements of the type illustrated in FIG. 1 are available under the name LEGO in a large variety of shapes, sizes, and colors. Furthermore, such construction elements are available with a variety of different coupling elements. It is understood that the above construction element merely serves as examples of possible construction elements.

FIG. 2 shows a schematic view of an example of a computer system. The computer system comprises a suitably programmed computer 15 and a display 1. The computer may be a personal computer, a desktop computer, a laptop computer, a handheld computer, a game console, a handheld entertainment device, or any other suitably programmable computer. The display 1 may be integrated into or otherwise operatively coupled to the computer 15, and operable to display, under the control of the computer 15, a video image.

It will be appreciated that the computer may comprise or be otherwise operatively coupled to further peripheral devices, such as a keyboard 3, a mouse 2 or other pointing device, such as a touch pad, a track ball, a light pen, a touch screen, or the like.

The computer system is adapted to facilitate to implement an augmented reality system as described herein. To this end, the computer 15 comprises or is otherwise operatively coupled to a video camera 5. The video camera 5 is operable to capture video images of the environment in which the video camera is situated, e.g. of a field of view 7 including a visible surface area 8 of a surface 4, e.g. a desktop, a floor, or the like. Hence the visible surface area 8 is the projection of the field of view of the video camera on the surface 4. The video camera is operable to forward the captured video image to a processing unit of the computer 15, e.g. via a suitable input interface of the computer 15. For example, the video camera may be a webcam connected to or integrated into computer 15. In the example of FIG. 2, the video camera is positioned on a camera support 6, such as a tripod, supporting the camera at a predetermined height above the surface 4.

Here, the video camera 5 captures video images of the environment 8 in which the video camera is situated and forwards the captured video images to the computer 15. For example, the environment in which the video camera is situated may comprise the toy construction model 10. In addition to the toy construction model 10, the environment may comprise further objects such other household objects, toys, or the like.

The computer images are then rendered by the computer 15 on the display 1. Therefore, a user may move the toy construction model 10 around and/or otherwise manipulate the toy construction model within the field of view of the video camera 5 and view live video from the video camera 5 of the toy construction model. Alternatively or additionally, the user my change the position and/or orientation of the video camera so as to capture images of a (e.g. stationary) toy construction model from different positions. Additionally, the computer may be operable to store the captured video images on a storage device such as a hard disk of the computer, and/or forward the captured video to another computer, e.g. via a computer network. For example, the computer may be operable to upload the captured video images to a website.

The computer 15 is suitably programmed to operate in an augmented reality building instruction mode in which the computer performs image processing on the captured video image so as to detect one or more predetermined augmented reality markers or tags within the captured video image.

Responsive to at least the detected AR marker(s), the computer may be programmed to generate a modified video image, e.g. a video image formed as the captured video image having a computer-generated image superimposed, or a video image wherein at least a part of the captured video image is replaced by a computer-generated image. The computer 15 is operable to display the modified video image on the display 1. For the purpose of the present description, a computer operable to implement AR functionality operatively connected to a video camera and a display will also be referred to as an AR system.

Image processing methods for detecting AR markers and for generating modified video images responsive to detected AR markers are known as such in the art (see e.g. Daniel Wagner and Dieter Schmalstieg, "ARToolKitPlus for Pose Tracking on Mobile Devices", computer Vision Winter Workshop 2007, Michael Grabner, Helmut Grabner (eds.), St. Lambrecht, Austria, February 6-8, Graz Technical University)).

In the example of FIG. 2, the physical toy construction model 10 comprises a toy construction element 9 having connected to it a marker construction element 11. The marker construction element 11 has an insignia in the form of a two-dimensional machine readable code on its top surface.

The computer 15 is operable to detect the presence of the two-dimensional machine readable code in the captured image. Furthermore, the computer 15 may determine a relative position and orientation of the two-dimensional machine readable code relative to the position of the video camera 15.

Accordingly, the computer 15 may modify the captured image of the toy construction model resulting in a modified video image 12 displayed on the display 1. In this example, the modified image shows the captured image 13 of the toy construction model and computer-generated image elements 14a and 14b superimposed the captured image. The computer generates the computer-generated image elements at a position and orientation within the video image 12 as determined from the detected position and orientation of the AR marker of the marker construction element 11.

As the user manipulates the physical toy construction model 10 within the projection area 8 of the video camera, e.g. by moving and/or rotating the physical model, the computer 15 tracks the position and orientation of the insignia of the marker construction element 11 of the physical toy. The computer 15 displays the live video feed of the video camera (mirrored mode) on the display 1 and adds, responsive to the detected position and orientation of the insignia, augmented reality special effects to the live video feed.

As will be described in greater detail below, the computer 15 may be adapted to show images of alternative toy construction elements 14a and 14b, respectively that may be added to the toy construction model 10. The user may thus select one of the alternative toy construction elements, and modify the physical toy construction model 10 by adding the selected construction element.

FIG. 3 shows a flow diagram of an embodiment of a process of displaying building instruction steps for a toy construction model. The process may be performed by a suitably programmed AR system, e.g. by the computer 15 of the system shown in FIG. 2. In initial step S1, the process receives an input indicative of the starting point of the construction process. For example, the starting point may be a previously constructed partial model, a base plate on which the model is to be constructed, or even an empty building environment where no components of the construction set have yet been arranged. For example, the process may receive such input in the form of a suitable user input, e.g. a user selection of a number of possible starting points. Alternatively or additionally, the process may receive the input in form of an image captured by a video camera of the AR system. In such an embodiment, the process may process the captured image so as to determine the starting point. For example, the user may position a base plate or another one or more toy construction elements within the field of view of the camera 5. When the base plate or other toy construction element includes an AR marker (or other suitable detectable visible feature), the AR system may detect the AR marker and extract information about the type of base plate or toy construction element from information embedded in the AR marker. The received input may also comprise information about the toy construction model or models to be built. For example, the information may include an identifier identifying the toy construction set from which the toy construction model is to be built, or identifying one or more toy construction models to be built.

The process then continues at step S2 with the detected starting point as current partial toy construction model. It will be appreciated from the above discussion, that the current partial toy construction model may include no, one, or several toy construction elements of the toy construction set.

In step S2, the process determines, based on the current state of the construction process, i.e. the current partial toy construction model, a number of possible continuations of the construction process. In particular, the process determines a set of alternative toy construction elements from the set of toy construction elements that may be added to the current partial toy construction model. For example, this determination may be based on a suitable data structure indicative, for a given partial toy construction model, of the set of possible subsequent toy construction elements that may be added to said partial toy construction model. An embodiment of such a data structure will be described below with reference to FIG. 4. If the determined number of options is zero, i.e. there are no further possible continuations, the process terminates; otherwise the process proceeds at step S3.

Figure 5:
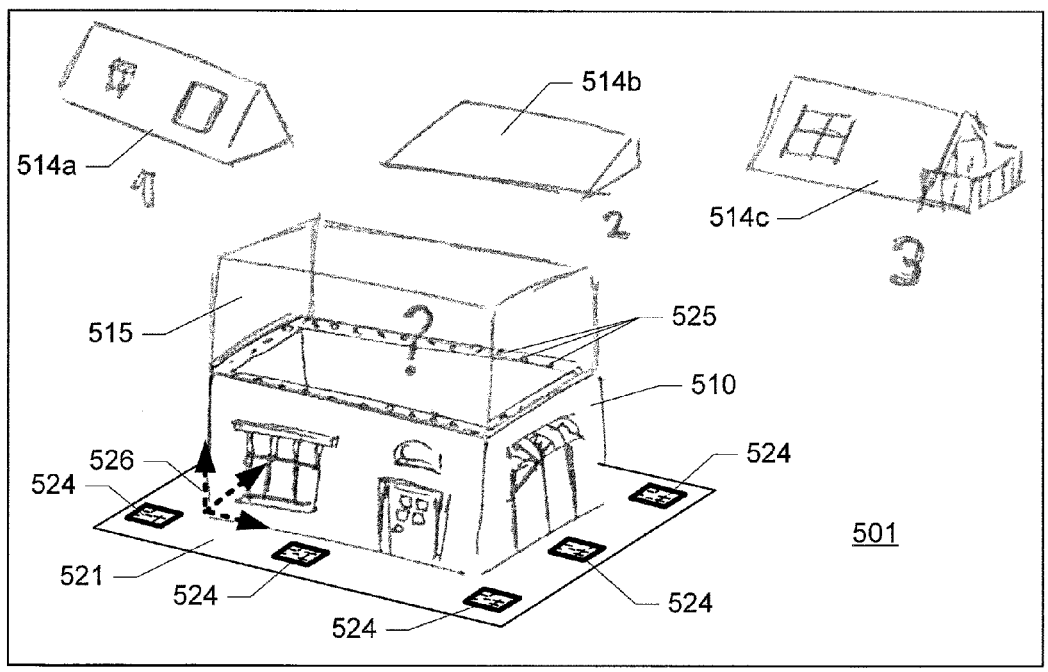
FIG. 5 illustrates an example of a display area of a display of a computer system as disclosed herein.

In step S3, the process presents the determined options to the user, e.g. by displaying images of the alternative toy construction elements that may be added to the model in the next step, e.g. as illustrated in FIG. 5. In some embodiments, the system further indicates to the user where the respective alternative toy construction elements should be added to the current partial toy construction model. For example, the AR system may display a combined image showing the captured image of the current partial toy construction model with images of the respective alternative toy construction elements superimposed at respective positions and orientations relative to the partial toy construction model indicating the respective positions where the alternative toy construction elements should be coupled to the current partial toy construction model. If two or more of the alternative toy construction elements should be added at the same position (or overlapping positions), the AR system may e.g. display a placeholder at the relevant position and images of the alternative toy construction elements in a proximity of the placeholder. Alternatively, the AR system may display the alternative toy construction elements at the relevant position one at a time, e.g. by cycling through the alternative toy construction elements and display each for a predetermined period of time.

In subsequent step S4, the process determines a user selection among the presented options. For example, the AR system may receive a user input indicative of a selection of one of the presented options. For example, each of the displayed images of alternative construction elements may correspond to an active element of a graphical user-interface displayed by the AR system, such that the active element may be activated, e.g. by clicking on it with a computer mouse, to select that construction element. In one embodiment, a selected construction element changes appearance. For example, the selected construction element may change colour, texture, etc.; it may be highlighted by showing a bounding box around the selected construction element, or the like.

Alternatively, the AR system may be operable to identify physical toy construction elements added to the current partial toy construction model by processing images of the toy construction model captured by the AR system. If, responsive to the display of alternative toy construction elements in step S3, the AR system identifies an added toy construction element that has been added to the current partial toy construction model, and if the identified added toy construction model corresponds to one of the alternatives presented in step S3, the AR system determines that the user has selected said alternative. If the added toy construction element does not correspond to any of the presented alternatives, the process may e.g. proceed with a suitable error message. In some embodiments, the process may further determine a position and optionally an orientation of the added toy construction element indicative of where the additional toy construction element has been added to the model.

In subsequent step S5, the process may, responsive to the detected selection, update a representation of the current toy construction model to a subsequent toy construction model. For example, the AR system may update a pointer or indicator indicating the current toy construction model in a data structure of toy construction model identifiers to point to a subsequent toy construction model. Optionally, the AR system may display image features, e.g. superimposed the video image of the captured image of the toy construction model, responsive to the detected user selection. For example, in an embodiment where the user selection is detected by a user input prior to the user adding the selected toy construction element to the current partial toy construction model, the AR system may display e.g. in the form of an animation, where and how the selected construction element should be connected to the current partial construction model. Alternatively or additionally, the AR system may display an animated storyline where the continuation of the story depends on the user selection.

Subsequently, the process returns to step S2 with an updated partial toy construction model as the new current partial toy construction model, where the updated partial toy construction model is derived from the current partial toy construction model of the previous iteration by the addition of the selected toy construction element.

FIG. 4 illustrates an embodiment of data structure for digitally representing a plurality of alternative sequences of construction steps of a construction process for building a toy construction model.

Figure 4A:
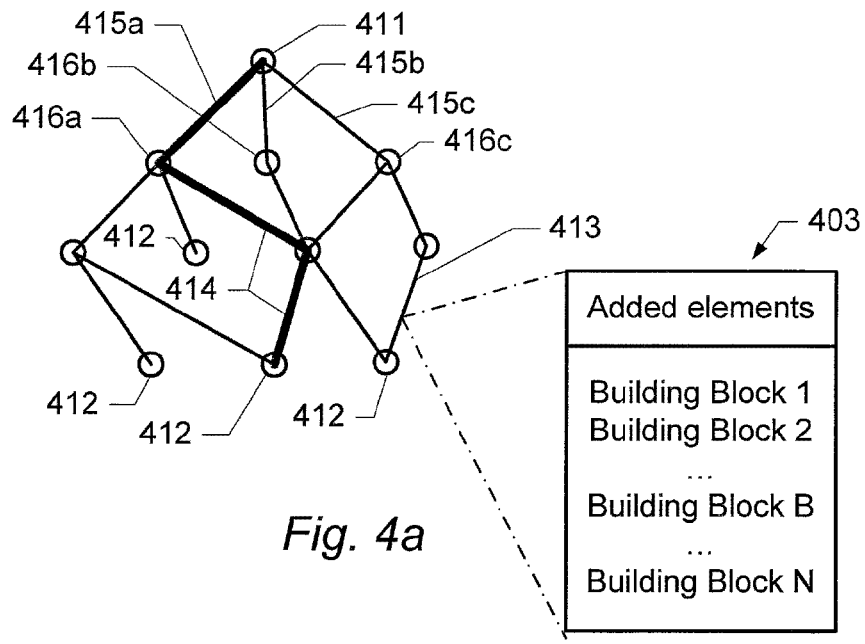
FIG. 4 illustrates an embodiment of data structure for digitally representing a plurality of alternative sequences of construction steps of a construction process for building a toy construction model.
Figure 4B:
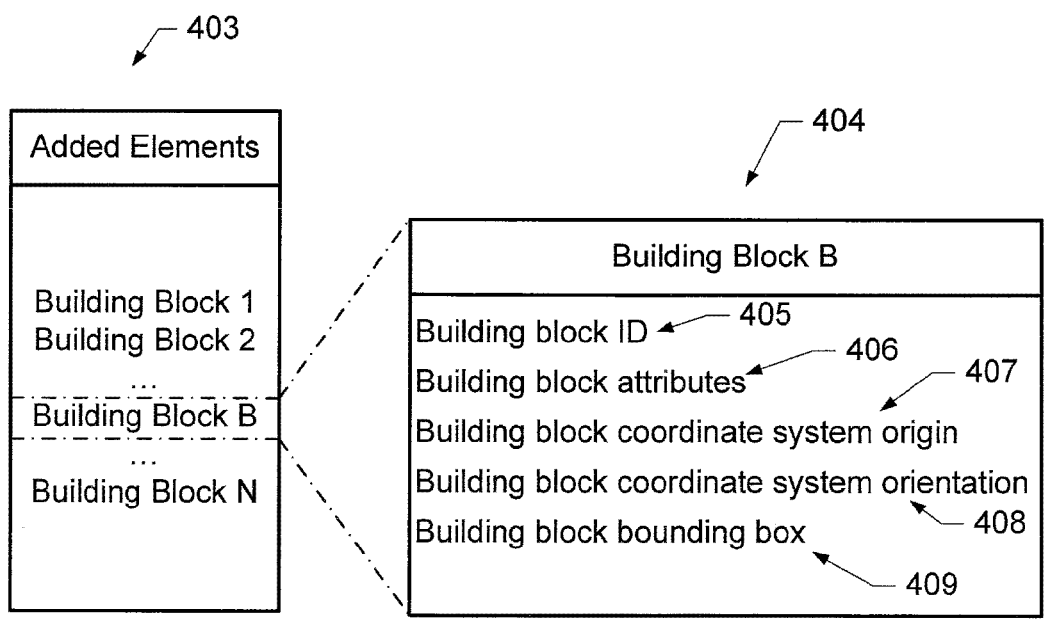

In one embodiment, the data structure 401 has the form of a tree structure as illustrated in FIG. 4a. The tree structure has a plurality of nodes and edges, where each node represents a toy construction model and where each edge connects two nodes and represents a construction step so as to transform the construction model represented by one of the nodes (the predecessor node) into the construction model represented by the second node (the successor node). The tree structure comprises at least one root node 411 that does not have any predecessor nodes and thus represents the starting point of a building sequence. Similarly, the tree structure comprises one or more leaf nodes 412 without any successor nodes, each representing a respective toy construction model constructable from the toy construction set. It will be appreciated that the tree structure may have one or more root nodes and one or more leaf nodes. Each non-leaf node thus represents a partial toy-construction model that may be transformed to one or several alternative subsequent (partial) toy construction model as represented by the successor nodes of said non-leaf node. Each non-leaf mode may thus have one or several successor nodes. The tree structure may thus represent an acyclic directed graph. The tree structure represents a plurality of construction paths such that each construction path connects one root node with one leaf node. It will be appreciated that the construction paths may have different lengths.

The data structure may comprise one or more data records including global model parameters relating to the entire set of construction models buildable from the building sequences. Examples of such model parameters include a model name, a name of a model creator, a program version number of the modelling application, a creation date, etc.

The model data structure 401 further comprises a plurality of edge data structures, each associated with one of the edges of the tree structure. For simplicity of illustration, only one of such edge data structures 403 is explicitly shown, associated with edge 413. It will be appreciated, however, that the other edges have corresponding data structures associated with them. Each edge data record represents one or more (e.g. a list of) toy construction elements each represented by a toy construction element data record. Each toy construction element data record may have the structure illustrated by the data record 404 for "Construction element B" shown in FIG. 4b.

In particular, each construction element data record 404 may comprise a construction element ID 405, indicating an identifier corresponding to the type of construction element. Preferably, the construction element ID uniquely identifies the properties of the construction element or type of construction element.

The construction element data record may further comprise a number of construction element attributes 406 indicating one or more attributes of the construction element, such as color, texture, decorations, etc.

Furthermore, the construction element data record 404 may comprise data items 407 and 408 representing the position and orientation of an internal coordinate system of the construction element, respectively. The position and orientation of the construction element may be defined by the coordinates of an origin of the internal coordinate system of the construction element with respect to a global "world" coordinate system, and by the orientation of the internal coordinate system with respect to the global coordinate system.

Furthermore, the construction element data record 404 may comprise data item 409 representing one or more bounding boxes of the construction element.

It is understood that the digital representation may be encoded in any suitable data or file format, e.g. as a binary file, as a text file according to predetermined modelling description language, or the like. An example of a data format for storing virtual building models that includes a hierarchy of coordinate systems is disclosed in U.S. Pat. No. 6,389,375.

Based on such a data structure, a computerised process for presenting building instructions may, based on information about a given starting point, determine a plurality of alternative subsequent construction steps. In particular, the process may determine the node in the tree structure corresponding to the starting point (e.g. the root node 411) and the edges connecting the starting point with its successors. Each edge represents an alternative subsequent step in the building process, e.g. an alternative construction element (or set of construction elements). When the process receives information about a user selection of one among the alternatives, the process may determine the corresponding successor node in the tree structure. The process may then iteratively proceed until the process reaches a leaf node. In the example of FIG. 4, an example of a resulting construction path is illustrated by a bold line 414. In this example, the starting point is the root node 411 and the construction path terminates in leaf node 412. In the first iteration, the process identifies edges 415a, 415b, 415c connecting root node 411 with its three successor nodes 416a, 416b, 416c, respectively. If the user selects edge 415a, the process proceeds to node 416a. It will be appreciated that some nodes may only have a single successor, i.e. during some stages of the construction process there may be only be a single route forward with no further alternatives to choose from. Similarly, some nodes may have more than one predecessors reflecting the fact that multiple construction paths may result in the same (partial) toy construction model.

FIG. 5 illustrates an example of a display area, generally designated 501, of a display of a computer system as disclosed herein, e.g. the system of FIG. 2. The computer system (not explicitly shown in FIG. 5) displays a captured image obtained with a video camera (not explicitly shown in FIG. 5) of the computer system. In this example, the image comprises an image of a physical toy construction model 510 located in the field of view of the camera. In this example, the toy construction model 510 is constructed on top of a base plate 521, and a part of a house built from one or more toy construction elements, e.g. elements similar to the ones shown in FIG. 1 having coupling studs 525 on their top surface allowing coupling of further construction elements. It will be appreciated, however, that the toy construction model may be any other model structure with or without base plate.

In this example, the base plate comprises a number of AR markers 524 distributed around the edge of the base plate. Each AR marker comprises a unique insignia allowing an AR system to identify the position and orientation of the toy construction model irrespective of its relative position or orientation relative to the camera. In this example, the AR markers 524 have the form of a 2D bar code or similar matrix code and they include a bounding box which provides a set of intersecting lines allowing the AR system to detect the insignia and its position and orientation. However, as will be described below, different types of AR markers may be used. In some embodiments, one or more of the toy construction elements from which the toy construction model 510 is constructed may comprise AR markers in addition to or instead of AR markers on a base plate.

In the example of FIG. 5, the computer system has determined three alternative continuations according to which the user may proceed constructing the toy construction model 510. Accordingly, the computer system displays images, e.g. computer-generated images, of the corresponding alternative construction elements 514a, 514b, and 514c superimposed the capture video image of the construction model 510. As the alternative construction elements would be added at the same position of the model, the computer system additionally displays a computer-generated image of a placeholder 515, e.g. in the form of a bounding box, indicating where relative to the model structure 510 each of the alternative construction elements would be added. For example, the computer system may determine the size of the placeholder from corresponding information included in a data structure representing the model, e.g. the tree data structure of FIG. 4. Similarly, the computer system may determine the correct position of the placeholder and/or the alternative construction elements relative to the image of the model from the information included in a data structure representing the model and from a position and orientation of the model structure 510 detected by the computer system. For example, the computer system may process the captured image to detect the AR markers. From the detected AR markers, the computer system may determine the position of a suitable coordinate system of the model. An example of such a coordinate system is illustrated as coordinate system 526 in FIG. 5, even though the determined coordinate system as such may not necessarily need to be displayed by the system. The computer system may then determine the position and orientation of the placeholder and/or the alternative construction elements from position and orientation information in the model data structure relative to the model coordinate system.

Figure 6:
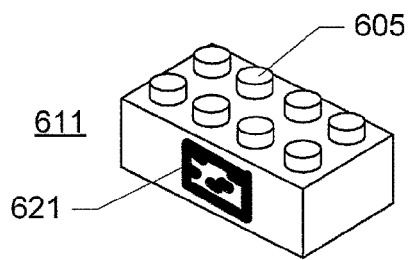
FIG. 6 shows a toy construction element in the form of a toy building brick.
Figure 7:
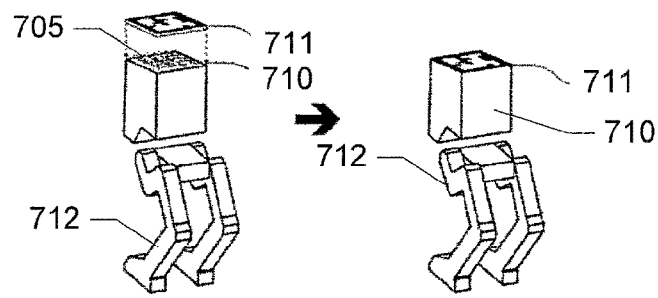
FIG. 7 illustrates how a marker construction element may be coupled to another toy construction element of a toy construction model.

FIGS. 6 and 7 schematically illustrate examples of toy construction elements comprising AR markers facilitating detection of the toy construction element by an AR system. For the purpose of the present description, such construction elements comprising an AR marker are also referred to as referred to a marker construction element FIG. 6 shows a toy construction element in the form of a toy building brick 611 similar to the building brick of FIG. 10, i.e. a building brick comprising coupling studs 605 arranged in a planar square grid on the top surface of the toy building brick. The toy building brick also comprises one or more cavities on its bottom surface (not shown in FIG. 6) for receiving and frictionally engaging coupling studs of another, similar toy construction brick. The toy building brick comprises, on one of its side faces, an augmented reality marker 621 in the form of a 2D bar code.

It will be appreciated that other forms of AR markers may be used instead of a 2D bar code. Generally, the AR marker may be any object that is relatively easy to automatically distinguish within the captured video images using known image recognition methods. Where the AR marker is detected using image recognition methods, the AR marker may be, for example, a three dimensional object such as a cube or a cylinder or it may be a two dimensional marker such as a square or a circle. Typically, the AR marker comprises an easily distinguishable pattern such as a black and white square although other methods may be used for marker recognition such as using a particular colour or pattern of colours and the like.

The AR marker may include one or more elements allowing the computer to detect a position and/or an orientation of the AR marker. For example, the AR marker may comprise two or more intersecting lines. Additionally or alternatively, the AR marker may comprise visual elements for encoding information, thus allowing the computer to identify and distinguish different types of markers and to generate computer-generated images selectively responsive to specific types of markers.

The AR marker may be arranged in a uniform manner relative to the coupling means, i.e. to the coupling studs on the top surface and/or to the coupling cavity in the bottom. For example, the AR marker may define a direction parallel or normal to the planar grid defined by the coupling means. This makes the marker bricks interchangeable, and in a toy structure built from bricks as in FIGS. 1 and 6, several marker bricks can be used interchangeably, and a particular marker brick can be used in several constructions. A toy construction system may comprise several of such marker bricks having different insignia applied to it and causing the computer system to generate different computer-generated images. Nevertheless, if all marker bricks include the insignia at uniform positions, such marker bricks may easily be interchanged within a toy construction built from the building bricks described herein. Furthermore, the AR system may use such uniformly positioned AR markers to accurately determine the position and orientation of construction elements relative to a coordinate system defined by the coupling means. Hence, the AR system may detect, based on a detected AR marker of a construction element, that a construction element has been added to an existing (partial) model, which type of construction element has been added, and where the construction element has been added relative to the existing model.

When the insignia is located on a part of the surface of the marker construction element such that the surface part comprising the insignia does not have any coupling means, the insignia is less likely to be unintentionally obstructed by other construction elements coupled to the marker construction element. A marker construction element may comprise a plurality of insignia, e.g. on different faces (or otherwise on different portions of the surface) of the toy construction element.

FIG. 7 illustrates how a marker construction element may be coupled to another toy construction element of a toy construction model. In this example, the toy construction model comprises toy construction elements 710 and 712 and a marker construction element 711. FIG. 7*a* shows the individual construction elements, while FIG. 7*b* shows the marker construction element 711 releasably coupled to the construction element 710. To this end, the toy construction element 710 comprises coupling studs 705 on its top surface as described in connection with FIG. 1. The marker construction element 704 comprises cavities on its bottom surface (not shown in FIG. 7), allowing it to frictionally engage the coupling studs 704.

Hence, the user may connect a marker construction element comprising an AR marker to a constructed toy model so as to facilitate detection and identification of the added marker construction element. Based on the detection, the AR system may determine possible subsequent construction elements that may be added to the model, and display images of the determined subsequent elements superimposed to the captured image of the model and at suitable positions relative to the captured image of the model. As in the example of FIG. 6, the insignia of the marker construction element 711 is located on a surface of the marker construction element that does not comprise coupling elements.

FIGS. 8*a-g* illustrate examples of composite marker construction elements, i.e. a plurality of marker construction elements directly or indirectly connected with each other by means of the coupling means of the toy construction system, e.g. in a predetermined spatial relationship with each other. Generally, composite marker construction elements allow the user to create a large set of distinct objects, each identifiable by one of a large number of unique AR markers. In particular, the large number of unique AR markers may be created from a relatively limited set of individual marker construction elements, because combining a smaller set of markers through a building system dramatically increases the total number of combinatorial possibilities. For example, the AR system may identify one (or a subset) of a large number of partial construction models from a composite marker construction element included in the partial construction model.

FIG. 8*a* shows an example of a human-like figure constructed from three marker construction elements, namely an element 811 resembling a head of the figure, an element 812 resembling the torso of the figure, and an element 813 resembling the legs of the figure. The construction elements are provided with coupling elements allowing a head and legs to be releasably coupled to the torso. The head, torso and legs may include insignia, e.g. in the form of facial features of the head and closing features of the torso and/or the legs. When presented to the video camera of an AR system, the AR system may thus detect the features of the head, the torso and the legs, e.g. as schematically illustrated in FIG. 8*b* by detected features 821, 822, 823 of the head, torso and legs, respectively. Hence, by combining different heads, torsos, and legs, a vast variety of combinations of AR markers can be created. Depending on which figure is detected by the AR system, the AR system may respond with different computer-created images, thereby allowing for a vast variety of interactions.

FIGS. 8*c* and *d* illustrate a similar composite marker construction element, constructed from toy building bricks as shown in FIG. 1*c*. The toy building bricks 831, 832, and 833 have different colors, e.g. red, white and blue, respectively. When stacked on top of each other and interconnected by their respective coupling means, the building bricks define a sequence of colors that may thus be detected by an AR system. By changing the order of the colors, as illustrated in FIG. 8*d*, different unique composite AR markers may be constructed from only three different marker construction elements.

FIG. 8*e* shows a similar example of a composite marker element, including toy building bricks 841, 842, 843 similar to the one shown in FIG. 6 having AR markers in the form of insignia on their side faces.

FIGS. 8*f-g* show jet another example of a composite marker element. In this example, the composite marker element comprises a base building brick 850, e.g. a brick similar to the brick of 1*c*, but with a larger number of coupling elements on its top surface. The composite marker element further comprises marker construction elements 851, 852, 853 connected to the base building brick 850. Hence, in this example, the marker construction elements 851, 852, and 853 are indirectly coupled to each other in a rigid configuration so as to form a composite marker construction element. To this end, the marker construction elements have coupling elements, e.g. cavities, on their bottom surface that can engage corresponding coupling elements, e.g. studs, on the top surface of the base building brick 850. Each marker construction element has an insignia on its top surface, in this example letters of the Roman alphabet. As the marker construction elements are arranged side by side, they define a sequence of insignia detectable by the AR system.

As illustrated by FIG. 8*g*, the insignia of the marker construction elements may define an orientation in a plane, and individual marker elements may be rotated with respect to each other, thus further increasing the degrees of freedom of defining multiple codes, as the AR system may detect the orientation of the respective AR markers relative to each other and/or relative to another feature of the toy construction model.

Figure 8:
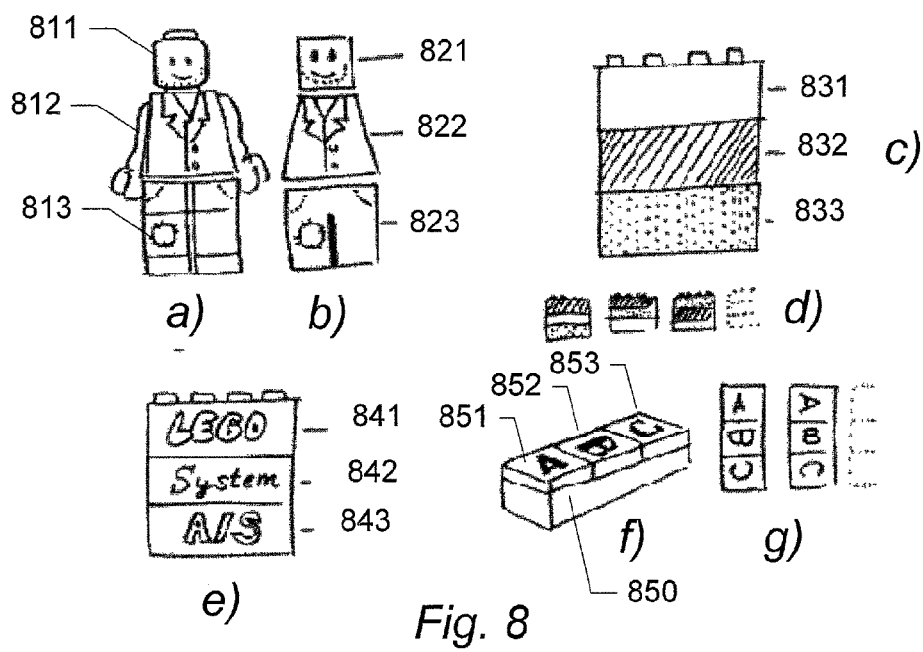
FIGS. 8a-g illustrate examples of composite marker construction elements.

Hence, in the examples of FIG. 8, individual marker construction elements, each comprising a visually detectable feature distinct from the other marker construction elements, are interconnected by means of their coupling elements, so as to define a sequence of visually detectable features. Each distinct sequence of visually detectable features may thus define a composite AR marker. For example, the individual visually detectable features may be detected by the AR system as symbols of a code, and a sequence of detected symbol may be decoded by the AR system so as to obtain information encoded by the sequence of symbols. In some embodiments, the system may use known error detection and/or error correction techniques for making the code more robust against detection errors.

FIGS. 9*a-b* illustrate an example of a toy construction system defining a regular grid.

FIG. 9*a* shows a perspective view of a toy construction element and its corresponding connectivity grids. The toy construction element 901 has a top surface 902 with eight knobs 903*a-h*, a bottom surface with corresponding holes (not shown) and side faces 904. In FIG. 9*a* connectivity grids 905 and 906 of the top surface and the bottom surface, respectively, are shown. The grid points are illustrated by circles as exemplified by circles 907*a-k*. Hence, grid points 907*a-h* correspond to knobs 903*a-h*, respectively. As the side surfaces 904 do not have any connection elements, no connection grids need to be defined for them.

As can be seen from FIG. 9a, a placement of the connection elements of the toy construction element defined by the grid points placed in a regular grid imposes certain constraints on the physical placement of the connection elements. The grid 905 is located in the plane of the top surface of the toy construction element from which the knobs 903 extend. In the example of FIG. 9a, the grid points are placed in a square grid where each square has a dimension of 5×5 units of an arbitrary length unit (LU). Hence, in this geometry, the connection elements are also placed on a corresponding square grid, and the distance between connection elements in a plane of the construction element is a multiple of 10 LU. In the example of FIG. 9a, the upper and lower surfaces of the construction element are rectangular and have a dimension of 20LU×40 LU, and neighbouring connection elements are spaced apart by 10 LU. In the vertical direction, on the other hand, the connection elements are spaced apart by 12 LU. Hence, the grid dimensions in different dimensions may vary. The location of the connection points is defined with respect to an internal coordinate system 908 of the toy construction element. By defining a position and orientation of the construction element (and thus its internal coordinate system) relevant to a global model coordinate system, the positions of the connection elements relative to the model coordinate system may be defined.

FIG. 9b illustrates a 3D regular grid of a model coordinate system where each grid point of the grid defines a valid position of a connection element within a toy construction model. It will generally be appreciated that not all grid points of the grid actually need to be populated by coupling elements; however, in some embodiments all coupling elements are positioned on grid points of the regular grid. In particular, in the example of FIG. 9b, the grid points are arranged in parallel planes 911a-d wherein grid points within a plane define positions of connection elements on a surface of one or more toy.

The distance between the parallel planes defines a distance between surfaces of construction elements having coupling elements. For example, in some embodiments, construction elements have a height that is equal to (or an integer multiple of) the distance between two neighbouring planes of the grid.

When the toy construction system defines a regular grid, the position and/or orientation of the AR markers may be accurately determined by the AR system relative to the grid. Furthermore, tracking markers that are attached to building elements in the grid of the building system provides more information about how the tagged elements are used in the model. Events in the application may selectively be triggered if the tags are build correctly, i.e. fit in the grid.

An AR marker may thus cause the AR system to initiate creation of computer generated image elements of alternative subsequent construction elements that may be added to the model responsive to a predetermined position and/or orientation (and/or other positional constraint) of the AR marker(s) relative to the grid. The AR application can thus react to how the physical elements are used in the building system.

The invention claimed is:

1. A computer-implemented method for generating building instructions for constructing a physical toy construction model from toy construction elements of a toy construction system, the toy construction elements comprising couplings for releasably interconnecting the toy construction elements; the method comprising:

capturing, by a digital camera, an image of a partial physical toy construction model constructed from a subset of the toy construction elements;

processing, by a digital processor, the captured image to detect at least a position and an orientation of the partial toy construction model;

determining a set of subsequent construction elements from a digital representation of the partial physical toy construction model and from a stored data structure indicative of a plurality of sequences of optional construction steps, each sequence resulting in one of a set of alternative construction models constructable from the set of toy construction elements;

displaying digital representations of the set of alternative construction elements in a user interface on a display;

identifying a user selection indicative of at least one of the set of alternative subsequent construction elements, each subsequent construction element being connectable to the partial physical toy construction model; and responsive to the detected position and orientation of the partial physical toy construction model, displaying, by the display, one or more composite images comprising the captured images of the partial physical toy construction model having superimposed thereon the digital representations of alternate of at least the selected subsequent construction elements connected thereto.

2. A computer implemented method according to claim 1, further comprising obtaining a digital representation of the partial toy construction model; and, responsive to the obtained digital representation, displaying respective images of the set of subsequent construction elements.

3. A computer implemented method according to claim 2, wherein obtaining a digital representation of the partial toy construction model comprises generating the digital representation of the partial toy construction model from a digital representation of a previous partial toy construction model and from a previous user selection.

4. A computer implemented method according to claim 2, wherein the digital representation includes respective position coordinates of each of the construction elements with respect to a predetermined coordinate system.

5. A computer implemented method according to claim 1, further comprising generating a digital representation of an updated partial toy construction model from a digital representation of the partial toy construction model and from the identified user selection.

6. A computer implemented method according to claim 1, wherein processing the captured image to detect at least a position and an orientation of the partial toy construction model comprises detecting at least one augmented reality marker and determining the position and orientation of the toy construction model from the detected at least one augmented reality marker.

7. A computer implemented method according to claim 1, wherein processing the captured image comprises identifying at least one added construction element; and determining the user selection from said identified added construction element.

8. A computer implemented method according to claim 7, wherein identifying the at least one added construction element comprises detecting an augmented reality marker included in the added construction element.

9. A computer implemented method according to claim 7, further comprising identifying a position and orientation of the added construction element relative to the partial toy construction model.

10. A computer implemented method according to claim 1, further comprising, responsive to the identified user selection and to the detected position and orientation of the partial toy construction model, displaying a composite image comprising the captured image having superimposed at least one additional computer-generated image.

11. A computer implemented method according to claim 1, wherein the set of toy construction elements comprises one or more marker construction elements comprising such couplings and each having a visual appearance recognisable by an image processor.

12. A computer implemented method according to claim 11, comprising at least two marker construction elements, where the two marker construction elements are releasably connectable with each other via their respective couplings, so as to form a composite marker element.

13. A computer implemented method according to claim 11, wherein the toy construction elements have one or more attributes, said attributes including one or more of color, texture, or decorations.

14. A computer implemented method according to claim 13, wherein the couplings are arranged in one or more regular planar grids defining the direction of connection; and wherein each marker construction element comprises an insignia visible, when the marker construction element is connected to at least one other toy construction element of the toy construction system, from a direction parallel to at least one of the planar grids or from a direction normal to at least one of the planar grids.

15. A computer implemented method according to claim 14, wherein each of the marker construction elements has a top surface, a bottom surface, and at least one side surface; wherein said couplings are placed on at least one of the top and the bottom surface; wherein the marker construction element comprises at least a first surface without couplings, where the first surface comprises said insignia.

16. A computer implemented method according to claim 12, further comprising detecting the composite marker element and identifying said user selection indicative of a user selection of at least one of said set of subsequent construction elements based on the detected composite marker element.

17. A computer implemented method according to claim 16, wherein each marker construction element comprises an insignia indicative of a code symbol of a code for encoding information; and further comprising determining, from the visual appearance of the composite marker element, an encoded set of code symbols, and decoding the determined set of code symbols to obtain decoded information.

18. A computer implemented method according to claim 1, wherein the couplings define a regular grid restricting a position and/or orientation of the toy constructing elements in a toy construction model to discrete positions and/or discrete orientations relative to said regular grid.

19. A computer implemented method according to claim 18, wherein the toy construction system comprises at least two marker construction elements, and further comprising detecting respective positions and/or orientations of the two marker construction elements in a toy construction model relative to said regular grid, and identifying said user selection indicative of a user selection of at least one of said set of subsequent construction elements based on the detected respective positions and/or orientations.

20. A computer implemented method according to claim 19, further comprising determining grid locations of a regular image grid from the detected locations of the marker construction elements, and generating an image feature of a computer-generated image at a location relative to the detected image grid.

21. A computer implemented method according to claim 1, wherein the couplings comprise one or more protrusions and one or more cavities, each cavity adapted to receive at least one of the protrusions in a frictional engagement.

22. A data processing system comprising an image capturing device, a processor, and a display, wherein the data processing system comprises a computer program configured, when executed by the data processing system, to cause the data processing system to perform the steps of the method according to claim 1.

23. A data processing system according to claim 22, wherein the toy construction elements comprise coupling means for releasably interconnecting the toy construction elements; and further comprising user instructions for installing, on the data processing system, the computer program.

24. A computer program comprising program code adapted to cause, when executed by a data processing system, said data processing system to perform the steps of the method according to claim 1.

25. A computer data signal embodied in a carrier wave and representing sequences of instructions which, when executed by a processor, cause the processor to perform the steps of the method according to claim 1.

* * * * *